Figure 1:
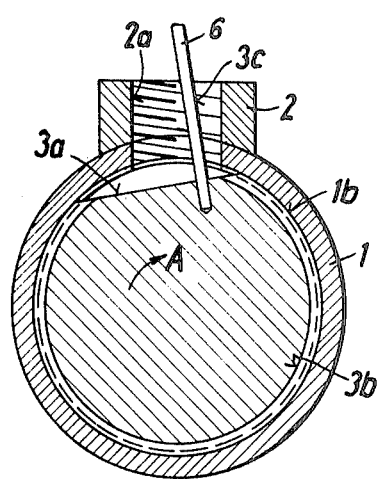

United States Patent

Freimuth

[15] 3,648,348
[45] Mar. 14, 1972

[54] ARRANGEMENT FOR RETAINING A CLOSING OR SUPPORT MEMBER IN A CYLINDRICAL HOUSING

[72] Inventor: Friedrich Freimuth, Lohfeldweg 15, 4975 Eidinghausen, Germany

[22] Filed: Apr. 20, 1970

[21] Appl. No.: 29,891

[30] Foreign Application Priority Data

Apr. 21, 1969 Germany ..................... P 19 20 093.2

[52] U.S. Cl. ............................................. 29/200 B, 29/439
[51] Int. Cl. .................................. B23p 19/00, B23p 11/00
[58] Field of Search ........................ 29/439, 200 B, 200, 240

[56] References Cited

UNITED STATES PATENTS 1,873,245  8/1932  Abegg ........................................ 29/439
1,899,343  2/1933  Mackey et al. .......................... 29/439

*Primary Examiner*—Thomas H. Eager
*Attorney*—Brown, Murray, Flick & Peckham

[57] ABSTRACT

Arrangement for retaining a closing or support member in a cylindrical housing, especially in a hydraulic cylinder by a retaining wire which is disposed in a circular channel formed by circular grooves in the housing and the closing or support member. The closing or support member has a bore and the housing has an opening extending substantially radially in the plane of the grooves to permit insertion of the wire in the bore, whereupon the closing and support member is rotated thereby to pull the wire into the channel formed by the two grooves, and to retain the closing and support member in engagement with the cylindrical housing.

10 Claims, 9 Drawing Figures

ARRANGEMENT FOR RETAINING A CLOSING OR SUPPORT MEMBER IN A CYLINDRICAL HOUSING

Arrangements for retaining members in cylindrical housings are basically known from the German Pat. Nos. 145,116; 261,373; and 926,826 and the publication "Antriebstechnik" Vol. 5 No. 7, 1966 pages 257–261.

These arrangements for securing cylindrical members in their housings have, however, several disadvantages. To provide the tangential hole in the housing for inserting the securing wire as shown in German Pat. No. 145,116 a drilling tool is necessary which assures alignment of the drilled hole and the groove in the housing. Furthermore, to permit insertion of the securing wire, there must be provided in the housing an elongated opening which must again be closed if the housing is a hydraulic cylinder, but even then reduces the strength of the cylinder wall. It is also necessary to preform one end of the wire and to cut the wire to length before insertion.

The principal object of the present invention is to provide a simple fastening arrangement for a member within a cylindrical housing which permits relatively easy and economical assembly of the member and housing.

With this object in view, the present invention resides in an arrangement for retaining a closing or support member in a cylindrical housing having an opening in its sidewall, said closing or support member and said housing having circumferential grooves which together form an annular channel in a plane extending substantially perpendicular to the axis of the housing sidewall and through the opening in the housing, said closing or support member having a recess formed therein in the area of the groove and a bore extending from said recess into the interior of the closing or support member, and a wire received in said channel for retaining said closing or support member in engagement with said housing, said wire being introduced into said channel by inserting it through the opening in the housing wall into the bore in the closing or support member and rotating the closing or support member thereby to bend the wire and to pull it into the channel.

For hydraulic cylinders as the housings, arrangements are preferred in which:

a flat surface on the closing or support member extends parallel to or at a slight angle with, the cylinder axis;
the length of the retaining wire exceeds the length of the groove, its free end abutting the wall of the opening, thereby to prevent loosening of the cylindrical member;
the retaining wire overlaps on the flat surface;
the maximal distance between the flat surface and the cylinder wall is not more than twice the diameter of the retaining wire;
the chamber formed by the flat surface and the cylinder constitutes a flow channel.

Additional parallel grooves, or grooves forming a thread may be provided. Also, the securing wire may consist of a wear resisting plastic.

If the member serves as a support structure provided with bushings, an opening may be formed in the bushings in alignment with the radial hole, whereby the securing wire, when fully inserted, will also prevent the bushing from axial and rotational movement.

Figure 2:
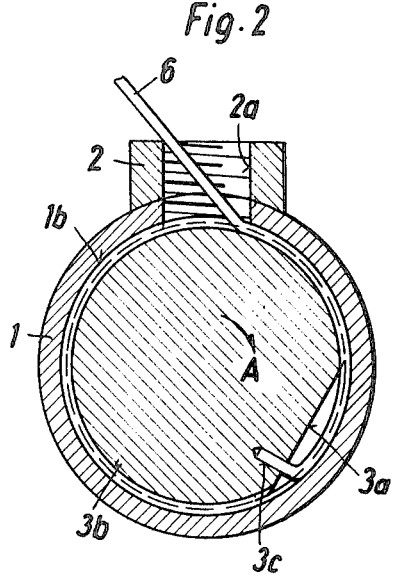
Figure 4:
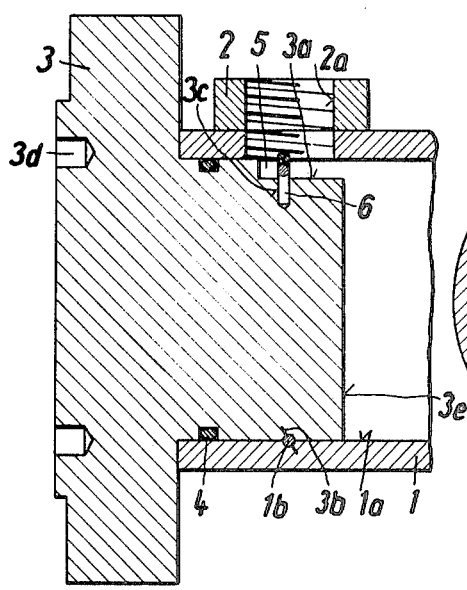
Figure 3:
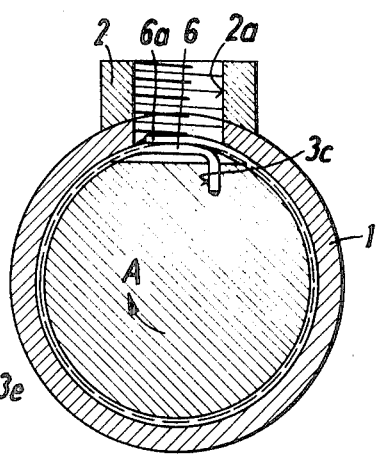
Figure 5:
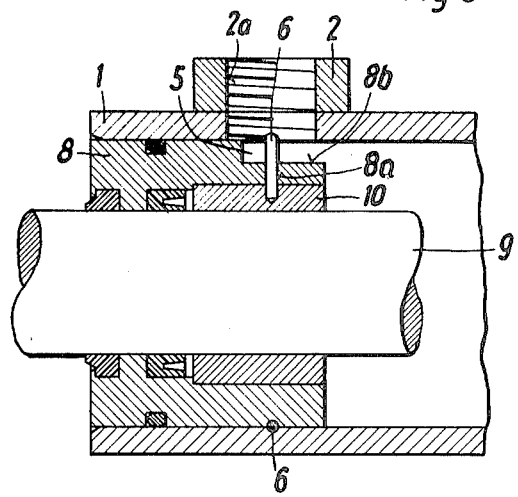
Figure 6:
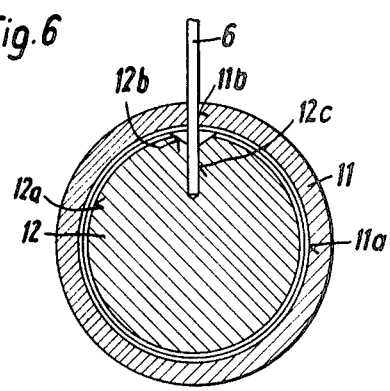
Figure 7:
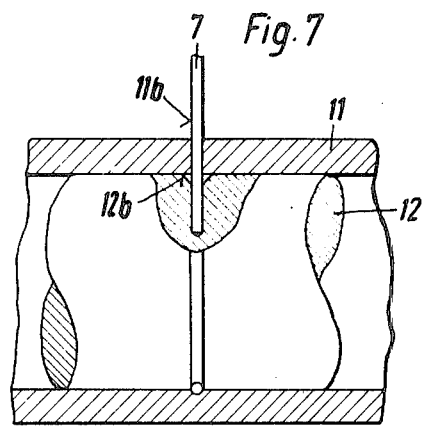
Figure 8:
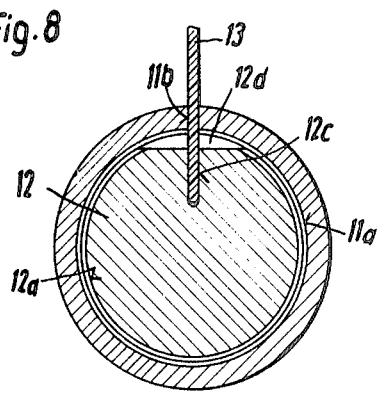
Figure 9:
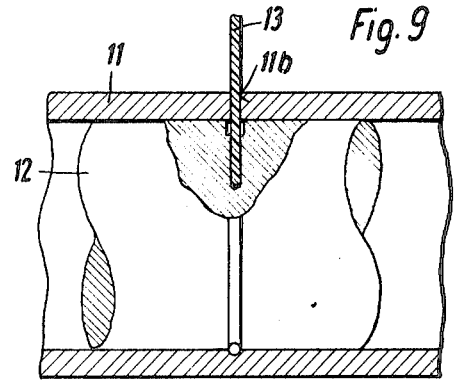

The invention will become more readily apparent from the following description of preferred embodiments thereof shown, by way of example only, in the accompanying drawings, in which:

FIG. 1 shows a cross section of the fastening arrangement before the securing wire is placed in the grooves provided therefor;
FIG. 2 shows a cross section with the securing wire partially inserted;
FIG. 3 shows a cross section of the arrangement with the securing wire fully inserted;
FIG. 4 shows an axial cross section of the closed end of a hydraulic cylinder;
FIG. 5 shows a cross section of the end of a hydraulic cylinder including a guiding member;
FIG. 6 shows a cross section of a fastening arrangement in which the closing member has a small depression;
FIG. 7 shows a longitudinal section of FIG. 6;
FIG. 8 shows a cross section of an arrangement in which the closing member has a tangential groove;
FIG. 9 shows a longitudinal section of FIG. 8.

The FIGS. 1–5 show a hydraulic cylinder 1, having connecting studs 2 at each end provided with threads 2a for the connection of hydraulic fluid lines. As shown in the FIGS. 1 – 5 a closing member 3 having a seal 4 and a flat surface 3a is inserted in the cylinder so that the flat surface 3a of the closing member 3 is positioned adjacent the connecting stud 2. The flat surface 3a extends to the end face 3e of the closing member 3, thus forming a flow channel 5 from the connecting stud 2 to the interior of the hydraulic cylinder. A hole 3c extends into the member 3 from its flat surface for the reception of a retaining wire 6. Circumferential grooves 1b and 3b are formed in the hydraulic cylinder 1 and the closing member 3 in a plane extending perpendicular to the axis of the cylinder and through the hole 3c so that, together, they form a channel corresponding in size to the diameter of the retaining wire 6. To retain the closing member 3 in the cylinder 1 the securing wire 6 is inserted via the connecting stud 2 into the hole 3c (FIG. 1) of the closing part 3 which is then rotated in the direction of the arrow A in FIG. 2. By this rotation, the straight retaining wire 6 (FIG. 1) is almost rectangularly bent over the flat surface 3a of the closing member 3, and is drawn into the channel formed by the grooves 1b, 3b. To facilitate rotation of the closing member 3, holes 3d are provided in its outer end to accommodate an appropriate rotating tool. The closing member may also have flat surfaces so as to permit the use of a wrench.

To prevent the closing member from turning backwards, the member is rotated somewhat more than a full revolution, thereby establishing an overlap of the retaining wire on the flat surface of the closing member (see FIG. 3). The free end 6a of the retaining wire 6 abuts the wall of the stud 2 thereby preventing rotation of the closing member in a direction opposite to that indicated by the arrow A.

By bending the free end 6a of the retaining wire back into the radial opening in the housing by an appropriate tool and rotating the closing member in a direction opposite to arrow A the retaining wire can be easily removed.

FIG. 5 shows an arrangement in which the closing or support member 8 supports a bushing 10, adapted to receive a piston rod 9. The bore 8a extends radially into the bushing, the retaining wire 6 extending into the bore 8a thereby securing the bushing in its position within the support member 8.

FIGS. 6 and 7 show an arrangement wherein a tubular housing 11 has a circumferential groove 11a and has a closing member 12 disposed therein, the closing member having a groove 12a formed together with groove 11a an annular channel with circular cross section. The opening 12c in the closing member 12 is conical at its outer end as shown at 12b. The conical enlargement of the opening 12c is such that the retaining wire, after being inserted into the hole 12c through the wall 11, can be bent when the closing member is rotated in the housing 11.

In FIGS. 8 and 9 a fastening arrangement is shown wherein the housing 11 has a closing member 12, the housing and the closing member being provided with adjacent grooves 11a and 12a, respectively, which together form a channel for the reception of retaining wire 13. Preferably, in this case, the wire consists of plastic and a groove 12d is provided which is wider than the wire 13.

I claim:

1. An arrangement for retaining a closing or support member in a cylindrical housing having an opening in its sidewall, said closing or support member and said housing having circumferential grooves which together form an annular channel in a plane extending substantially perpendicular to the axis of the housing and through the opening in the housing, said closing or support member having a recess formed therein in the area of the groove and a bore extending from said recess into the interior of the closing or support member, and a wire received in said channel for retaining said closing or support member in engagement with said housing, said wire being introduced into said channel by inserting it through the opening in the housing wall into the bore in the closing or support member and rotating the closing or support member thereby to bend the wire and to pull it into the channel.

2. An arrangement as claimed in claim 1, wherein the circular portion of the wire is longer than the channel and the free end of the wire overlaps the other end of the wire and abuts the wall of the opening in the housing.

3. An arrangement as claimed in claim 2, wherein the depth of said recess is not more than twice the diameter of the wire.

4. An arrangement as claimed in claim 1, wherein said recess extends axially from the opening in the housing to the inner end of the closing or support member thereby forming a communication path from the opening in the housing to the interior of the housing.

5. An arrangement as claimed in claim 1, wherein at least one annular seal ring surrounds the closing or support member between said recess and the outer end of the closing or support member.

6. An arrangement as claimed in claim 1, wherein at least two parallel channels are formed in the housing and closing or support members, each channel having a retaining wire disposed therein.

7. An arrangement as claimed in claim 1, wherein channel forming grooves are threads extending circumferentially at least 720° and the retaining wire disposed in the channel surrounds the closing and support member at least two times.

8. An arrangement as claimed in claim 1, wherein the closing or support member is provided with means facilitating rotation thereof.

9. An arrangement as claimed in claim 1, wherein the closing or support member has an axial opening and a bushing supported in said opening, said bore and the wire in said bore extending into said bushing for securing said bushing in said closing or support member.

10. An arrangement as claimed in claim 1, wherein said wire consists of a high-strength plastic material.

* * * * *